United States Patent [19]

Smith

[11] 4,113,060
[45] Sep. 12, 1978

[54] DRIVE SHAFT "U" JOINT LUBRICATOR

[76] Inventor: Roy B. Smith, 3480 NE. 62, Washington Ct. House, Ohio 43160

[21] Appl. No.: 807,984

[22] Filed: Jun. 20, 1977

Related U.S. Application Data

[63] Continuation-in-part of Ser. No. 635,439, Nov. 26, 1975, Pat. No. 4,040,504.

[51] Int. Cl.² ............................................. F16N 13/22
[52] U.S. Cl. ....................................... 184/6; 64/17 A; 64/23
[58] Field of Search ................. 184/6.28, 6, 26; 64/23, 64/17 A, 32 F

[56] References Cited

U.S. PATENT DOCUMENTS

| | | | |
|---|---|---|---|
| 3,326,323 | 6/1967 | Delker | 184/6 |
| 3,785,460 | 1/1974 | Smith | 184/43 |
| 3,805,553 | 4/1974 | Yehl | 64/32 F X |
| 3,962,889 | 6/1976 | Stillwagon | 64/32 F |
| 3,991,855 | 11/1976 | Heintzelman | 64/17 A X |

*Primary Examiner*—David H. Brown
*Attorney, Agent, or Firm*—Sidney W. Millard

[57] ABSTRACT

An annular lubrication reservoir is mounted on the periphery of a rotatable shaft, the reservoir defining a fluid tight annular enclosure having one or more apertures through its surface. Conduit means are connected to the apertures for conducting lubrication from the reservoir to a bearing surface. Valve means are mounted adjacent the aperture to limit the lubricant flow to one direction, out of the reservoir toward the bearing surface. A piston pump is mounted in association with the apertures whereby on rotation of the shaft the piston is driven radially outward to force lubricant out of the reservoir through the valve and into the conduit.

10 Claims, 7 Drawing Figures

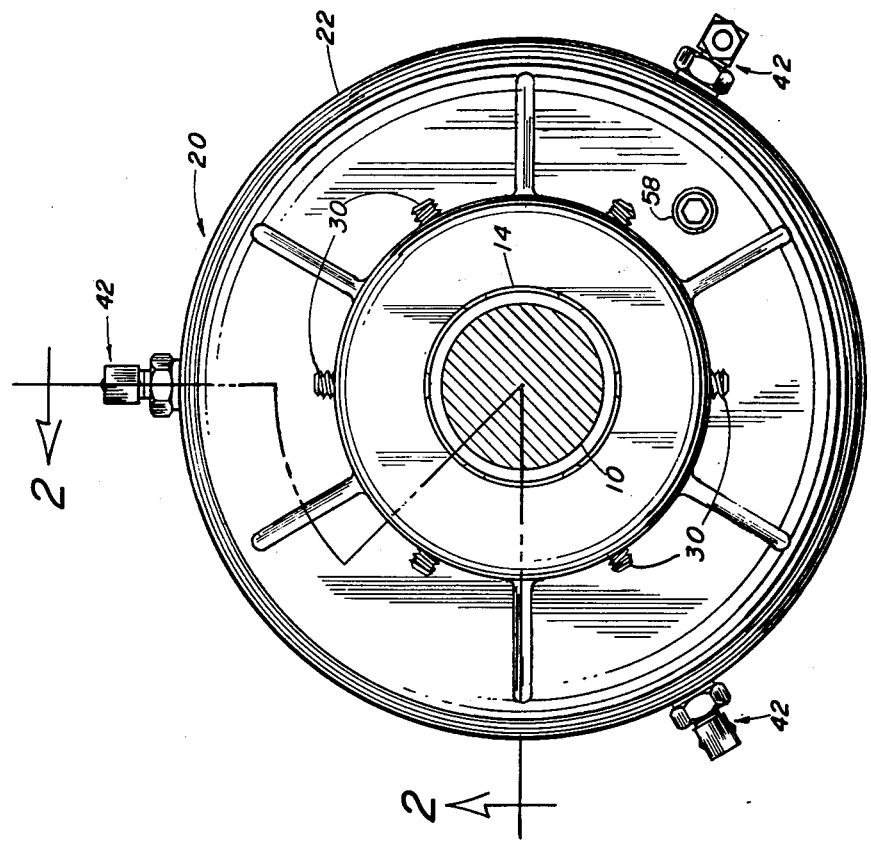
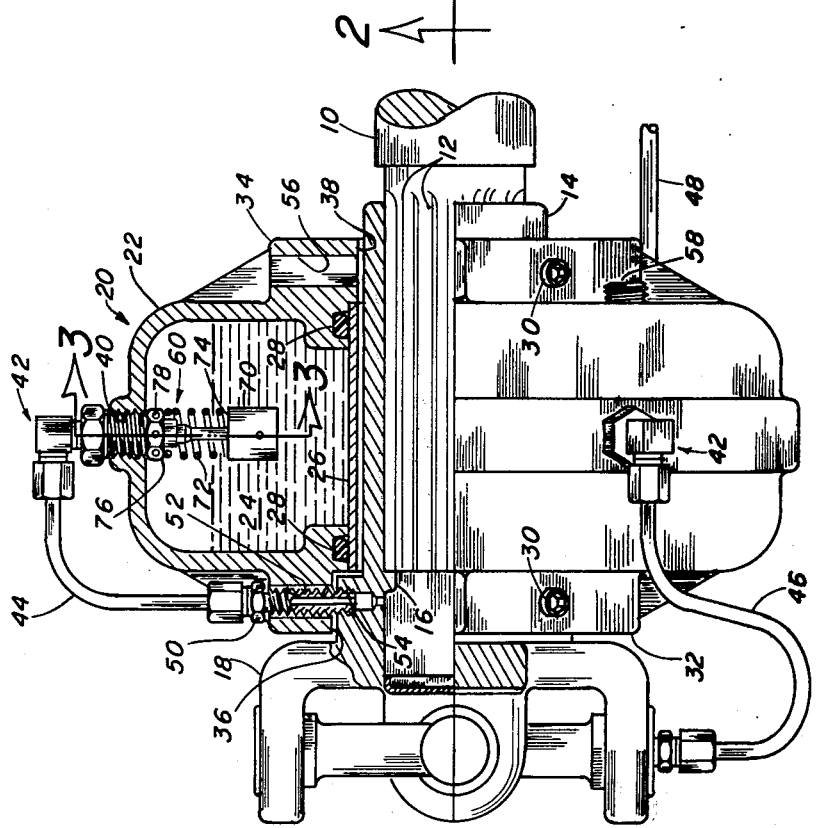
Fig.1
Fig.2

DRIVE SHAFT "U" JOINT LUBRICATOR

BACKGROUND OF THE INVENTION

This is a continuation-in-part of application Ser. No. 635,439, filed on Nov. 26, 1975 now U.S. Pat. No. 4,040,504. Automatic lubrication means for universal joints are not new. Representative of the prior art are the patents to Kayser, U.S. Pat. No. 3,006,168, dated Oct. 31, 1961, Freeman, U. S. Pat. No. 3,123,990, dated Mar. 10, 1964, and Delker, U.S. Pat. No. 3,326,323, dated June 20, 1967, all of which were considered in the above identified parent application. These inventions all require specially constructed drive shafts with lubricant reservoirs in the yoke or the drive shaft itself.

Each company manufacturing trucks and commercial vehicles designs its own drive shaft along with body style and all other facets of the vehicle. Thus, drive shafts are not standard as to length or diameter and to have an automatic lubrication system according to the prior art, one would have to have enumerable sizes and lengths of drive shaft especially constructed to replace existing equipment. As will be clear to those in the commercial vehicle industry, the replacement and labor costs are prohibitive.

What is needed is an independently mountable lubrication system which is universally applicable to the drive shafts of all commercial vehicles. The invention described herein is just such a device.

Heretofore, it was recognized that a great deal of difficulty is encountered in trying to lubricate a rotating joint, in that, the conduits conducting the lubricant must rotate simultaneously with the joint or else the lubrication can be achieved only during the times of complete stoppage of the joint. Hand operated lubrication by a grease gun is common.

SUMMARY OF THE INVENTION

This invention provides for a symmetrically balanced reservoir to be mounted on the periphery of any existing drive shaft on a commercial vehicle. It is held in place on the shaft by a plurality of set screws projecting through hubs on each side of the reservoir.

Lubrication is delivered from the reservoir through apertures in the radially outermost portion of the reservoir in one embodiment and through the side in another embodiment. Conduits connected to the apertures deliver the lubricant to various bearing surfaces distributed from one end of the drive shaft to the other. The lubrication apparatus herein described is limited to delivery of lubricant to openings rigidly connected to the shaft, it being clear that the conduits rotate with the shaft.

Valving means are provided in the apertures of the reservoir to prevent backflow of the lubricant into the reservoir after the lubricant is delivered to the conduit. The valving means comprises an O-ring in tension, resting in and sealing against both sides of a groove. Lubricant in the reservoir is in fluid communication with the innermost portion of the groove and pressure applied to the lubricant in the innermost portion of the groove overcomes the tension in the O-ring forcing it partially out of the groove and allowing lubricant under pressure to escape into the conduit. Alternatively, a spring biased ball check valve may be mounted in the outlet flow line.

A chamber or cylinder is mounted adjacent the aperture with one part being in communication with the innermost portion of the groove or outlet and another part being normally in fluid communication with the inside of the reservoir by virtue of openings through the side wall of the chamber. A piston is mounted in the chamber and designed to reciprocate in the chamber with the piston being biased radially inward toward the shaft and in its innermost position leaving the side opening into the chamber open to the lubricant in the reservoir. A weight or mass is attached to the piston whereby, on rotation of the shaft the mass of the piston and its attached weight overcomes the biasing means and drives the piston radially outwardly into the cylinder and in one embodiment in its movement the piston seals the openings in the side wall of the chamber and thereby places the lubricant in the cylinder under pressure. Said pressure is transmitted through the lubricant into the groove with resultant expansion of the O-ring and escape of the lubricant as it is driven into the conduit by the radially outward pressure exerted by the piston. Only one charge of lubricant will be delivered to the conduit each time the shaft begins rotation. For example, assuming the shaft is a drive shaft in a commercial vehicle, the piston will charge one unit of lubricant every time the motor is started. Another charge will not be delivered until the drive shaft stops, the piston retracts and the shaft restarted. Alternatively, by choosing a spring with proper stiffness the piston may retract at idling speeds (1,000 rpm) such that more frequent lubrication will result. Additionally, with the stiffer spring the lubricant will be moved to the periphery of the reservoir by centrifugal force by the rotation prior to piston movement and thereby a full cylinder is assured.

Objects of the invention will be clear from the following detailed description of the preferred embodiments.

BRIEF DESCRIPTION OF THE DRAWINGS

FIG. 1 is an end elevational view of the reservoir of this invention mounted on a shaft.

FIG. 2 is a side elevational view of the reservoir of FIG. 1 partially in section taken along line 2—2.

DESCRIPTION OF THE PREFERRED EMBODIMENTS

Figure 3:
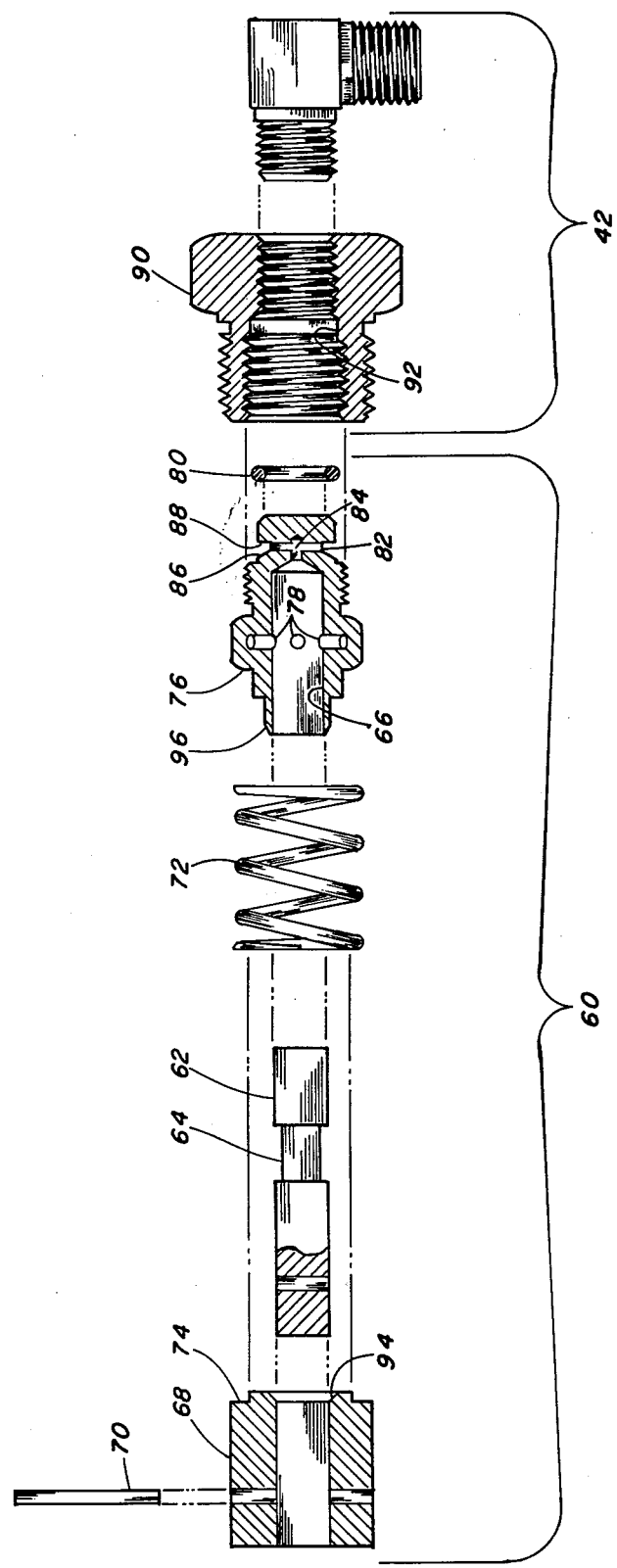
FIG. 3 is an exploded sectional view of the valving and lubricant charging apparatus of FIG. 2 taken along line 3—3.
Figure 4:
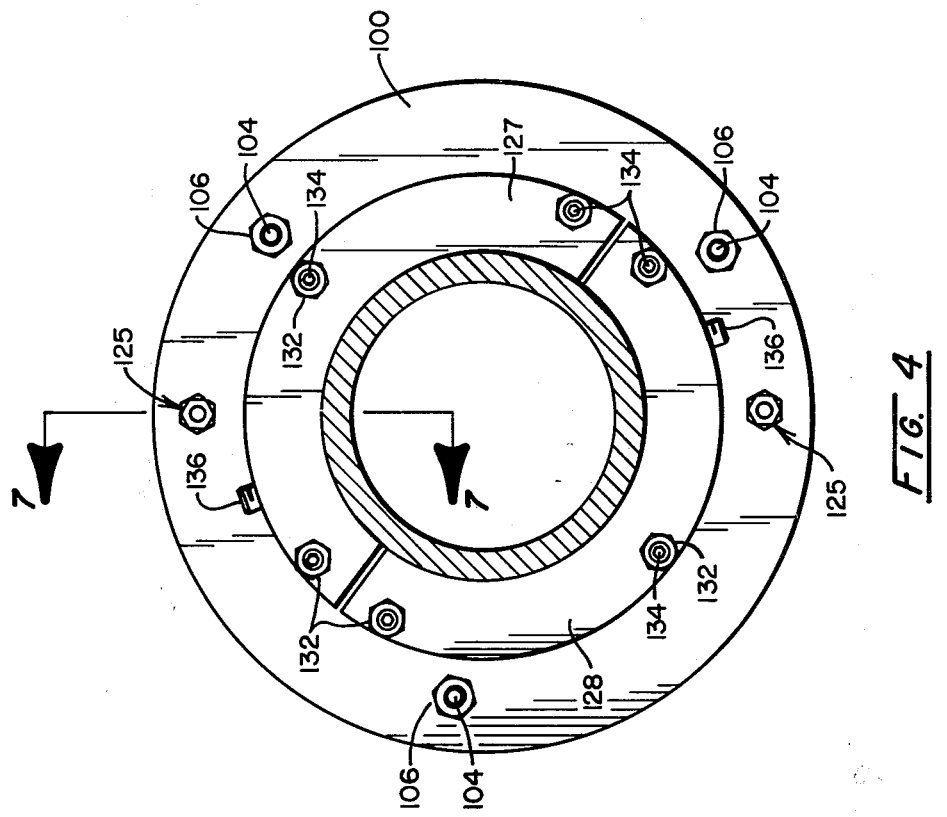
FIG. 4 is an end elevational view of another embodiment of the lubricator mounted on a hollow shaft.
Figure 5:
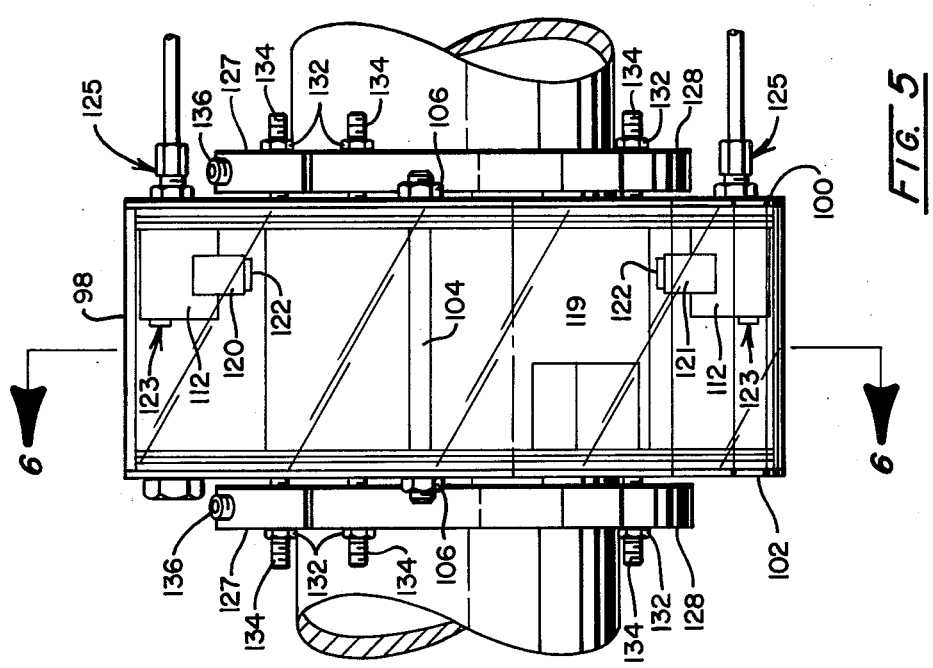
FIG. 5 is a side elevational view of the lubricator of FIG. 4.
Figure 6:
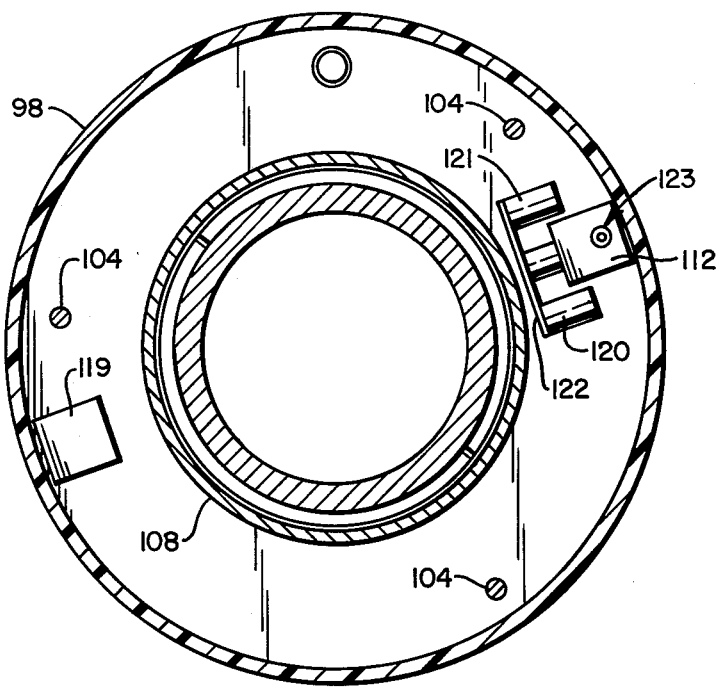
FIG. 6 is a sectional view taken along line 6—6 of FIG. 5.

This invention involves automatic lubrication of universal joints of motorized vehicles. A conventional drive shaft 10 is illustrated in FIGS. 1 and 2 having mounting grooves 12 at its end. A sleeve 14 having inwardly projecting ribs 16 which slide into grooves 12 is mounted concentrically on the shaft 10 to support a conventional yoke 18 which makes up part of a conventional universal joint. Universal joints in commercial vehicles must be lubricated periodically and apparatus for such automatic lubrication illustrated generally at 20 is designed to be mounted concentrically with the shaft 10 and sleeve 14.

The apparatus 20 includes a reservoir 22 of constant volume comprising a hollow rigid casting designed to hold about 5 pints of lubricant 24. The radially inner portion of the cavity of the casting 22 is defined by sleeve 26. Elastomeric seals 28 are mounted in grooves machined into the inner surface of the casting and serve the purpose of preventing the escape of lubricant 24 between the casting and sleeve 26.

The reservoir 22 is mounted on sleeve 14 by set screws 30 which extend through threaded openings in hubs 32 and 34 projecting axially from each end of the casting.

It will be observed that hub 32, nearest the yoke 18, has a cylindrical inside surface 36 which is greater in diameter than the inside surface 38 of hub 34. The surfaces 36 and 38 are designed to be 3¾ inches and 3¼ inches (approximately 9.53 and 8.25 centimeters) respectively so they will easily slide over a range of conventional sizes of sleeves and drive shafts. That is, the illustrated reservoir is designed to operate and be mounted on a wide variety of shaft sizes without any modification of the shaft.

As will be clear from an observation of the structure illustrated, the housing reservoir 22 is reversable in that, with larger sizes of sleeves 14, the larger inside diameter of hub 36 is mounted adjacent the yoke 18. Should the sleeve 14 be of smaller size the casting 22 would be reversed with the smaller sized diameter inside hub 34 being mounted nearest the yoke. The set screws 30 nearest the yoke are to hold the reservoir rigidly in place and the set screws remote from the yoke are for balance and maintaining the reservoir generally concentrically mounted around the shaft 10 to prevent vibration upon rotation.

Threaded apertures 40 are provided which extend through the radially outermost portion of the reservoir 22 and appropriate fittings indicated generally at 42 are mounted in the aperture 40 to connect various conduits 44, 46, and 48 in fluid communication with the inside of the reservoir. The conduits are designed to conduct lubricant from inside the reservoir to some remote bearing surface or cavity in need of lubrication. For example, conduit 44 is attached to a fitting 50 which projects through a smooth opening 52 in hub 32 and threads into an opening 54 in the sleeve 14.

It will be observed that an opening 56 through hub 34 is designed to receive a similar fitting 50 should the reservoir be reversed as described above. It will also be observed that the two smooth openings 52 and 56 are aligned and diagonally opposite a plug 58 threaded into the fill aperture of the reservoir. The mass of the casting removed to form openings 52 and 56, the fitting 50 inserted, the plug 58 and their distances from the center of the rotation or axis of the shaft are closely correlated such that equilibrium balance is achieved to prevent vibration during the conventional rotation of the drive shaft. It is important that such vibration not occur for the obvious mechanical reasons, but during the course of the design and experimentation of this invention it was discovered that the lubricant being of thixotropic composition generally, although occasionally of a lower viscosity similar to conventional motor oil, assists in the rotational balancing of the structure. That is, the lubricant mass shifts to positions within the reservoir cavity which tend to balance the apparatus 20 overall in its high speed rotation with the drive shaft 10. This interesting equilibrium balance achieved by the lubrication helps to overcome small imbalances which are inherent, but it is limited in how much equilibrium balance it can achieve and care must be taken in the casting and machining of the apparatus to try to insure as much balance as possible.

Piston pumps indicated generally at 60 and illustrated in exploded view in FIG. 3 are threadedly connected to fittings 42 to mount the pump generally in the aperture 40. One piston pump will be mounted in each aperture as will be explained in more detail subsequently.

A piston 62 on one end of a shaft 64 is designed to reciprocate in a chamber or cylinder 66. On the opposite end of shaft 64 is mounted a weighted mass 68 which is attached to the shaft 64 by a conventional pin connection 70.

Spring biasing means 72 acting against shoulders 74 and 76 on the mass and cylinder, respectively, bias the piston 62 to its radially innermost position. The piston is prevented from leaving the cylinder 66 by virtue of the method of assembly of the apparatus which will be explained in more detail subsequently.

At its radially innermost position the piston 62 is disposed radially inward of the openings 78 which project radially through the side wall of the chamber 66 to allow lubricant to enter the chamber during the rotation of the drive shaft 10.

Valving means is provided by circular O-ring 80 mounted in the groove 82. It will be observed that the groove 82 is in fluid communication with the inside of chamber 62 by virtue of passage 84 and that the groove is defined by two sides 86 and 88. The radially innermost side 86 slopes such that the groove 82 converges inwardly. The radially outermost side defines a plane perpendicular to a line extending radially from the axis of the shaft 10 through the center of the circular elastomeric O-ring 80. It is important that the surface 88 be flat to prevent the camming outwardly of the O-ring 80 on high speed rotation of the shaft 10. Should the surface 88 be sloping, upon high speed rotation of the shaft lubricant discharged initially into the conduit 44 might feed back under back pressure into the chamber 66; however, with the surface 88 flat the O-ring 80 is not cammed out of sealing position and accordingly, the back pressure will tend to more firmly seat the O-ring against the two surfaces 86 and 88 to prevent backflow of lubricant.

In operation in initial assembly, the O-ring 80 is expanded and slipped into place in the groove 82. The diameter of the O-ring and the spacing of the walls 86 and 88 are such that the O-ring 80 is in tension when it is in contact with surfaces 86 and 88 such that, the O-ring acts as a sealing valve type arrangement preventing fluid flow in any direction unless overcome by pressure from the inside of groove 82. Next the means forming the chamber 66 is threaded into the fitting 90 such that the O-ring will be aligned with a smooth cylindrical surface 92 which is large enough to allow slight expansion of O-ring 80 but prevents the O-ring from being dislodged from the groove 82.

The mass 68 is attached to the piston 62 by pin 70, the spring 72 is mounted between the surfaces 74 and 76 and the piston 62 inserted into the cylinder 66. Then the spring 72 is compressed so that the piston is pushed to its radially outermost position such that the sloping surfaces 94 and 96 on the mass and chamber, respectively, are in contact. Surface 94 is at a 45° angle and surface 96 is at a 60° angle. With the surfaces 94 and 96 in contact a light blow by means such as a light hammer is applied to the mass 68 which crimps the surface 96 slightly inward and thereby prevents the removal of the piston 62 from the cylinder 66. The angles at 94 and 96 are not critical but, care must be taken to prevent the inwardly swaged surface at 96 from engaging shaft 64 which would impair reciprocation.

To mount the apparatus 20 in operable position, the yoke 18 will be disengaged from the remainder of the U-joint and dropped down so the sleeve 12 can be removed from the shaft 10. The apparatus 20 then slides into place over the shaft, the sleeve remounted and the yoke reattached. The set screws 30 may be tightened into operative position either before or after the yoke 18 is attached to form the U-joint. Similar comments are applicable to fitting 50.

Thereafter, the conduits 44, 46, and 48 are mounted in operative position. As illustrated, conduit 44 is designed to lubricate the end of shaft 10, conduit 46 is designed to lubricate the bearings of the universal joint and conduit 48 is designed to lubricate some bearing surface at the opposite end of shaft 10. Obviously, the conduits must rotate with the drive shaft and whatever surface is lubricated must also rotate with or be in direct contact with, the shaft or its attachments.

As the shaft begins to rotate the lubricant 24 will be propelled radially outward by centrifugal force and will lie in the reservoir 22 in a ring against the outer surface of the reservoir. This will force the lubricant into the chamber 66 through openings 78. As greater speed is achieved in the rotation, the mass 70 and piston 62 will be propelled by centrifugal force radially outward and as they overcome the spring bias 72 the piston will move radially outward to cover the openings 78 and thereby trap a full chamber of lubricant. Increased pressure exerted on the lubricant by the piston will be transmitted through the lubricant to the inside surface of the elastomeric O-ring 80 and the O-ring will expand outwardly allowing the lubricant under pressure to escape along the sides of the groove such that it will flow outward through fittings 42 and conduits 44, 46, and 48. The volume of the chamber can be adjusted as needed but a similarly operating piston pump 60 will be mounted in each aperture 40 in the radially outer wall of the reservoir.

Only one charge of lubricant will be delivered to each conduit with each starting of the motor of the commercial vehicle involved. The piston will remain in its radially outer position until such time as the shaft comes to rest and the spring bias 72 forces the piston back to its radially innermost position. Restarting the motor and rotation of the drive shaft begins the sequence again. As previously indicated, the spring stiffness may be chosen to allow it to force the piston inward at idling speeds of about 1,000 rpm if desired.

Turning now to the second embodiment illustrated in FIGS. 4-7, the reservoir includes an annular clear plexiglass cylinder 98 defining the radially outer surface of the reservoir and two cast metallic end pieces 100, 102 which are bolted together by a plurality of studs 104 and nuts 106. The inner surface of the reservoir is defined by a metallic cylinder 108. The metallic cylinder is held in place by an appropriate adhesive and one suggested adhesive is the General Electric brand "metallic silicon glue and seal". A seal is provided between the plexiglass cylinder 98 and the end pieces 100, 102 by an O-ring 110 mounted in a groove in each of the metallic end pieces.

The "chambers" in this embodiment are defined by a lug 112 cast integral with the end pieces 100, 102 and machined to provide a chamber 114 to accommodate a piston 116, spring biased radially inward by spring 118. Note that there are two lugs (diagonally spaced, for dynamic balance) on each end piece but there are only three feed lines. One lug 119 is not machined, it is merely a balancing structure in the lubricator.

In this embodiment the weights or masses mounted to help force the piston radially outward on rotation of the drive shaft are located slightly differently. Note in FIG. 6 a pair of weights 120, 121 are mounted on a spanner 122 extending on each side of the piston 116.

As can be observed, in this embodiment the radial distance from the surface of the drive shaft to the outer extension of the reservoir is much less than the embodiment of FIGS. 1-3 and this embodiment is designed to accommodate very small clearances which occur in some truck structures. As a result there is not adequate space inside the reservoir to have the weight mounted on the piston as in the previous embodiment of FIGS. 1-3. It will further be noted that there is no positive locking of the piston within the cylinder or chamber 114, rather the displacement of the piston radially inward to the surface of the metallic cylinder 108 is less than the radial length of the piston 116 and therefore the surface of cylinder 108 serves to block the further inward travel of the piston.

In operation, the chamber 114 is charged with lubricant at the time the drive shaft is slowing down from its normal driving speed but while the annular ring of lubricant is still held against the outer plexiglass cylinder by centrifugal force. At such time as the spring 118 overcomes the centrifugal force and biases the piston inward a vaccuum will be created within chamber 114. This causes the spring biased ball check valve 123 to retract to allow lubricant to flow into the cylinder from the reservoir through duct 124. Check valve 123 will close when the chamber 114 is full and pressure balance is achieved. Upon subsequent acceleration or speeding up of the drive shaft centrifugal force will push the piston radially outward which will open spring biased ball check valve 125 in the outlet 126 to allow the discharge of lubricant into the associated conduit. Such check valves are well known in the art and no detailed explanation appears necessary.

Figure 7:
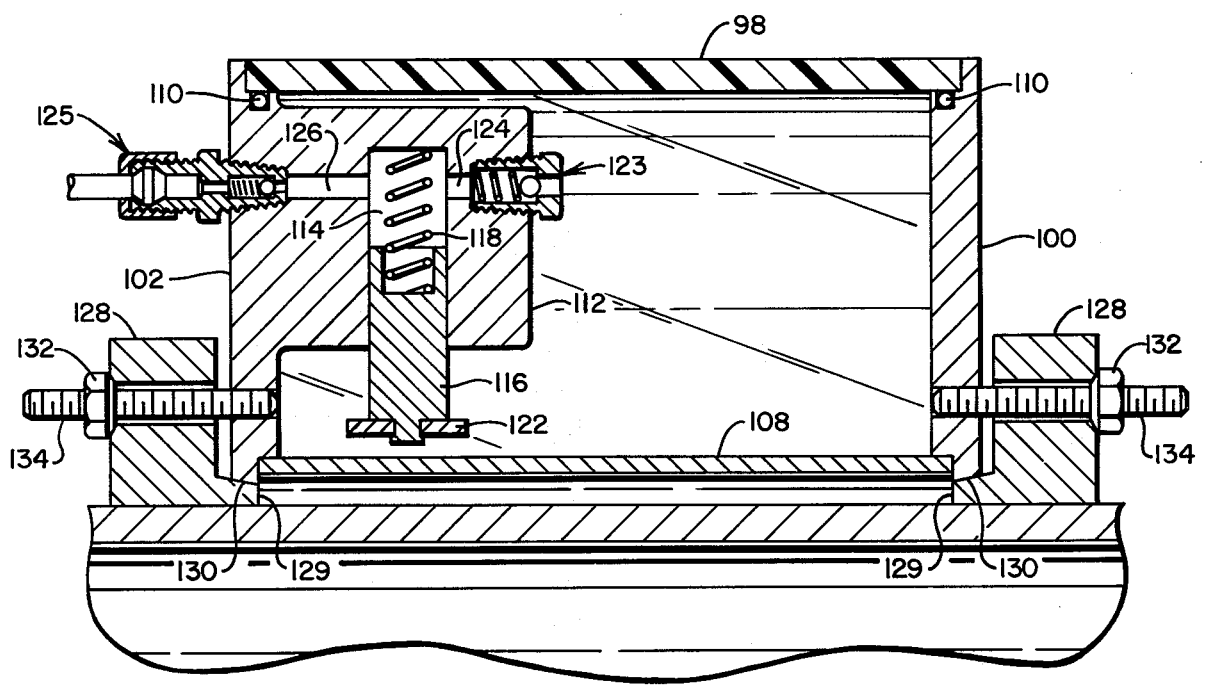
FIG. 7 is a sectional view taken along line 7—7 of FIG. 4.

During the mounting of the reservoir on the periphery of the shaft or yoke a pair of split collars 127, 128 are employed to serve the same function as hubs 32 and 34 of the prior embodiment. That is, they serve as axial extensions of the reservoir to allow set screws to pass therethrough in threaded engagement for engaging the surface of the drive shaft to hold the reservoir in place and to center the reservoir substantially concentrically about the shaft. However, the split collars 127, 128 have a slightly different and enhanced holding function, in that, they are semi-circular but slightly less than 180° in their extension around the drive shaft. In FIG. 7 it will be observed that an inwardly extending toe 129 on the collars 127, 128 converges inwardly at an angle of about 10° and that a mating surface 130 also at about 10° on the end plates 100, 102 will serve to cam the toe 129 inward as the nuts 132 are tightened on studs 134. Thus, the collar mounting process will bind the inner surface of the collars on the yoke or shaft surface before tightening of the set screws 136 is begun. Thereby, the stability of the apparatus may be enhanced.

It will be obvious that not any single set of split collars will fit all drive shaft sizes and it is the intention of this invention to supply various sizes of collars on demand to accommodate the several commercial sizes of shafts or yokes to be lubricated with this apparatus. Thereby, the reservoir and attachments are standard. Only the collars need to be specified. It is equally clear that the mounting mechanisms of the two embodiments illustrated can be interchanged if desired.

Having thus described the invention in its preferred embodiments, it will be obvious to those having ordinary skill in the art that certain modifications could be made to the structure described herein without departing from the spirit of the invention. It is not the intention of the inventor to be limited by the language used to describe the invention nor the drawings illustrating the preferred embodiments, rather it is the intention of the inventor to be limited only by the scope of the appended claims.

I claim:

1. In the combination of a shaft rotatable about an axis and automatic lubrication apparatus for lubricating parts rotating with the shaft, the lubrication apparatus including a reservoir adapted to store a lubricant, said reservoir being defined by means forming a fluid tight rigid annular enclosure of constant volume removably rigidly mounted coaxially with and on the periphery of said shaft, at least one aperture through the surface of the annular enclosure, conduit means connected between said aperture and a bearing surface for conducting lubricant from said reservoir to said bearing surface, said bearing surface and conduit being connected to rotate with said shaft, valve means mounted adjacent said aperture for allowing lubricant to flow only out of the reservoir into the conduit, means forming a chamber adjacent said aperture, said valve means being disposed near the radially outer end of said chamber means, a piston mounted to reciprocate within said chamber means and biased radially inwardly, opening means into the chamber means from the reservoir, said opening means being radially outward of said piston where said piston is biased to its radially innermost position, a mass mounted to move with the said piston to drive said piston radially outward upon rotation of said shaft.

2. The combination of claim 1 wherein the valve means includes a spring biased ball check valve.

3. The combination of claim 1 wherein the valve means comprise a resilient O-ring disposed in an inwardly converging annular groove, the innermost portion of the groove being in fluid communication with said chamber means, the O-ring being in tension while in sealing contact with both sides of said groove.

4. The combination of claim 3 wherein the side of the groove most remote from the shaft defines a plane perpendicular to a line extending radially of said shaft axis where said line passes through the center of a circle defined by the O-ring.

5. The combination of claim 1 including an annular hub projecting axially from each side of the reservoir with radially extending threaded openings in each hub and set screws in said threaded openings, said set screws being tightened into tight contact with the shaft to center the reservoir on the shaft and prevent rotation relative to the shaft.

6. The combination of claim 5 wherein the inside surfaces of the hubs are of different diameters to accommodate different sizes of ends on rotable shafts.

7. The combination of claim 1 including semicircular collars mounted on the reservoir by means for swagging the collars radially inwardly toward the surface of the shaft.

8. The combination of claim 1 including three apertures, each with associated valve means, piston and chamber means cooperatively mounted adjacent said apertures and conduit means connected to each said aperture to conduct lubricant from the reservoir to a bearing surface.

9. The combination of claim 8 wherein the valve means comprise a resilient O-ring disposed in an inwardly converging annular groove, the innermost portion of the groove being in fluid communication with said chamber means, the O-ring being in tension while in sealing contact with both sides of said groove.

10. The combination of claim 9 wherein the side of the groove most remote from the shaft defines a plane perpendicular to a line extending radially of said shaft axis where said line passes through the center of the circle defined by the O-ring.

* * * * *